United States Patent [19]

Momyer et al.

[11] Patent Number: 4,514,474
[45] Date of Patent: Apr. 30, 1985

[54] AIR CATHODE STRUCTURE MANUFACTURE

[75] Inventors: William R. Momyer, Palo Alto; Ernest L. Littauer, Los Altos Hills, both of Calif.

[73] Assignee: Lockheed Missiles & Space Company, Inc., Sunnyvale, Calif.

[21] Appl. No.: 474,502

[22] Filed: Mar. 11, 1983

[51] Int. Cl.³ .......................................... H01M 12/04
[52] U.S. Cl. ........................................ 429/27; 429/29; 429/41
[58] Field of Search ................. 429/27, 28, 29, 40, 429/41, 44, 42

[56] References Cited

U.S. PATENT DOCUMENTS

| | | | |
|---|---|---|---|
| 3,043,898 | 7/1962 | Miller et al. | 429/27 |
| 3,438,815 | 4/1969 | Ginger | 136/86 |
| 3,600,230 | 8/1971 | Stachurski et al. | 429/42 |
| 3,615,872 | 10/1971 | Gehring et al. | 429/40 |
| 3,791,871 | 2/1974 | Rowley | 136/100 R |
| 4,001,043 | 1/1977 | Momyer | 429/206 |
| 4,104,197 | 8/1978 | Heffler | 429/27 |
| 4,221,846 | 9/1980 | Armstrong et al. | 429/29 |
| 4,269,907 | 5/1981 | Momyer et al. | 429/67 |
| 4,364,805 | 12/1982 | Rogers | 204/98 |
| 4,364,806 | 12/1982 | Rogers | 204/98 |
| 4,389,466 | 6/1983 | Joy | 429/27 |

Primary Examiner—Donald L. Walton
Attorney, Agent, or Firm—Wood, Dalton, Phillips, Mason, & Rowe

[57] ABSTRACT

An improved air cathode structure for use in primary batteries and the like. The cathode structure includes a matrix active layer, a current collector grid on one face of the matrix active layer, and a porous, nonelectrically conductive separator on the opposite face of the matrix active layer, the collector grid and separator being permanently bonded to the matrix active layer. The separator has a preselected porosity providing low IR losses and high resistance to air flow through the matrix active layer to maintain high bubble pressure during operation of the battery. In the illustrated embodiment, the separator was formed of porous polypropylene. A thin hydrophobic film is provided, in the preferred embodiment, on the current collecting metal grid.

6 Claims, 1 Drawing Figure

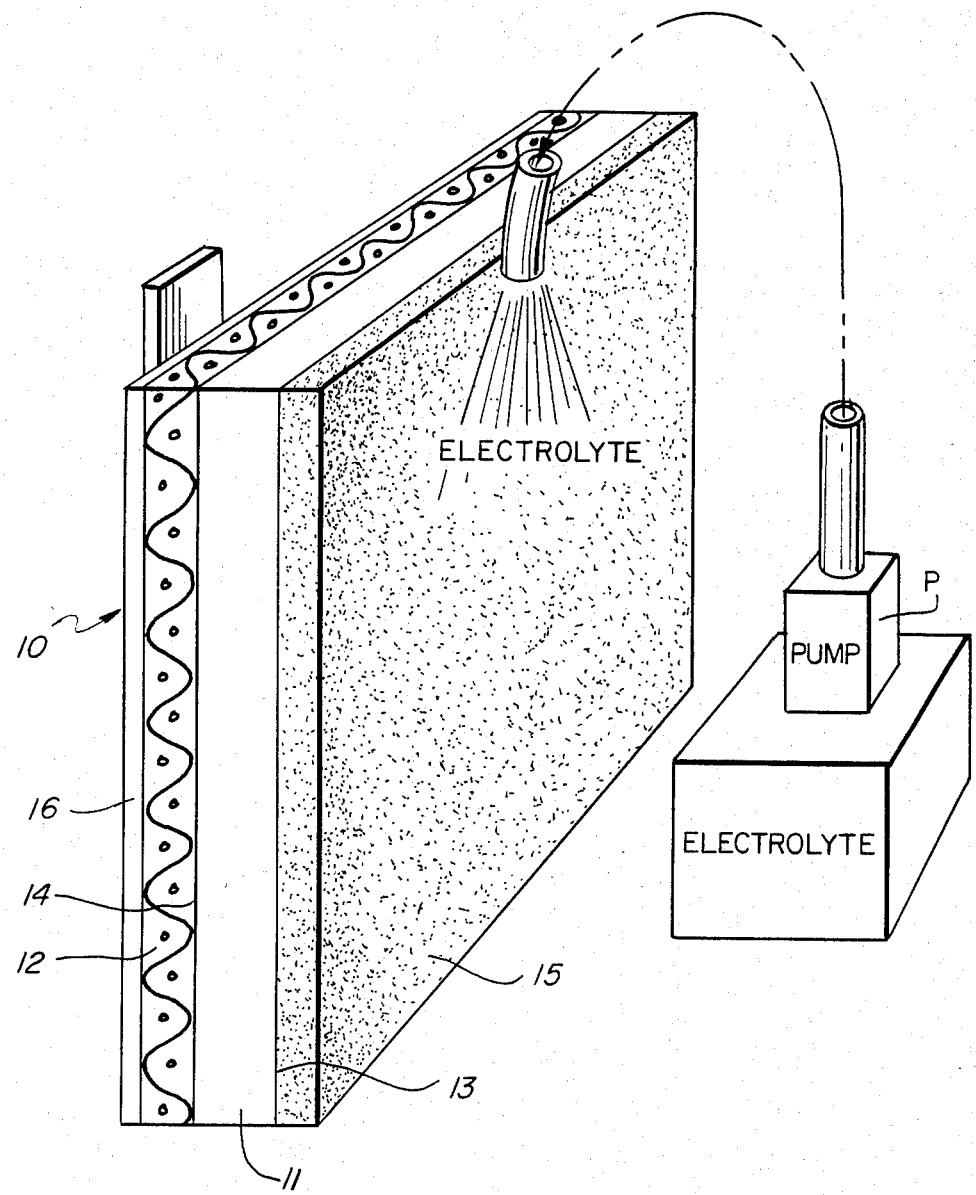

AIR CATHODE STRUCTURE MANUFACTURE

TECHNICAL FIELD

The U.S. Government has rights in this invention pursuant to Purchase Order No. 5513309 with The Continental Group, Inc. under Prime Contract No. W-7405-ENG-48 between The University of California and the U.S. Department of Energy. This invention relates to primary battery structures and, in particular, to air cathode structures for use therein.

BACKGROUND ART

In one form of known electrochemical cell for use as a primary battery, aqueous electrolyte is flowed between a reactive metal anode and an air cathode. The anode is conventionally formed of a chemically and electrochemically reactive metal, such as lithium and sodium. Illustratively, such electrochemical cells are disclosed in U.S. Pat. Nos. 3,791,871 of Leroy S. Rowley, 4,001,043 of William R. Momyer, and 4,269,907 of William R. Momyer, et al, disclosures of which are hereby incorporated by reference.

It has been found that air cathode structures, such as those developed for fuel cells, are not adaptable for use in such electrochemical cells as they have been found to have insufficient durability to withstand degradation by the electrolyte flowing across the electrolyte face of the cathode element, and the pressure imbalances which are present at the cathode structure during discharge of the electrochemical cell.

Illustratively, in U.S. Pat. No. 4,364,805 of Douglas K. Rogers, an air cathode is disclosed utilizing air blow-through at pressures in the range of 2 to 15 psig.

In U.S. Pat. No. 4,269,907 of William R. Momyer et al, an electrochemical cell is disclosed wherein the reactive metal anode is separated from the cathode by a nonconductive flow screen.

In U.S. Pat. No. 3,438,815 of Jose D. Giner, an electrochemical device is disclosed wherein at least one of the anode and cathode comprises an integral porous metal layer in physical contact with a separate catalytic layer. The integral porous metal layer is in contact with the electrolyte of the cell in operation thereof.

In the above indicated U.S. Pat. No. 4,269,907 of William R. Momyer et al, a nonconductive element is disposed between the anode and cathode to maintain proper spacing therebetween.

DISCLOSURE OF INVENTION

The present invention comprehends an improved air cathode structure for use in a primary battery having a reactive metal anode and an aqueous electrolyte which is flowed against one surface of the air cathode structure. The invention comprehends provision of such an air cathode structure having a matrix active layer, a current collector grid on one face of the matrix active layer, and a porous, nonelectrically conductive separator on the opposite face of the matrix active layer, the collector grid and separator being permanently bonded to the matrix active layer, the separator having a preselected porosity providing low IR losses and high resistances to air flow through the matrix active layer to maintain high bubble pressure characteristics thereof.

In the illustrated embodiment, the separator comprises porous polypropylene.

In a modified embodiment, the separator comprises asbestos paper.

The invention further comprehends the improved method of forming such an improved air cathode structure for use in a primary battery wherein an electrically insulative porous separator is integrally bonded to a face of a matrix active layer opposite the current collector face thereof.

In the illustrated embodiment, the step of integrally bonding the separator to the matrix active layer comprises a step of thermal bonding.

In the illustrated embodiment, the thermal bonding is carried out under pressure.

Illustratively, the separator, in the illustrated embodiment, is bonded to the matrix active layer by hot pressing thereof thereagainst.

The porosity of the insulative separator is preselected to minimize IR drop therethrough while maintaining a high resistance to air flow through the matrix active layer.

The improved air cathode structure and method of manufacture thereof are extremely simple and economical while yet providing the highly improved primary battery means discussed above.

BRIEF DESCRIPTION OF THE DRAWING

Other features and advantages of the invention will be apparent from the following description taken in connection with the accompanying drawing wherein the FIGURE is a fragmentary perspective view of the air cathode structure embodying the invention.

BEST MODE FOR CARRYING OUT THE INVENTION

In the illustrative embodiment of the invention as disclosed in the drawing, an improved air cathode structure generally designated 10 for use in a reactive metal-aqueous electrolyte-air primary battery is shown to include a matrix active layer 11. A current collector grid 12 is provided on one face of the cathode layer 11.

In such batteries, anodes are typically of an alkali metal, such as lithium, sodium or potassium. Electrolytes are typically aqueous solutions of alkaline materials, such as hydroxides of alkali metals, for example. Lithium hydroxide is an example of such an electrolyte material.

As indicated briefly above, in such reactive metal-aqueous electrolyte-air cathode batteries, the electrolyte flowing from a delivery pump P tends to degrade surface 13 of the cathode against which it is flowed, i.e., opposite the air surface 14 to which the collector grid 12 is bonded.

As indicated briefly above, the invention comprehends the provision of a porous control layer 15 on surface 13. In the illustrated embodiment, porous layer 15 comprises a layer of porous polypropylene, which is permanently bonded to the matrix active layer 11 surface 13 as by thermal bonding thereto. Illustratively, the polypropylene layer is permanently bonded to the layer 11, in the illustrated embodiment, by a hot pressing operation.

As further shown in the drawing, a hydrophobic, thin protective film 16 is provided on the current collector grid 12, and in the illustrated embodiment, this film comprises a polytetrafluoroethylene film, which is similarly permanently bonded to the grid in the hot pressing operation.

Porous layer 15 effectively defines a separator for effectively preventing electrical shorting between the cathode and anode at the narrow electrode spacings conventionally utilized in reactive metal-H₂O-air primary batteries.

Further, the porous layer 15 permits the pressurized air directed to surface 14 through the layer 16 and grid 12 to be at a positive pressure, such as in the range of 2 to 15 psig, relative to the electrolyte pressure.

Still further, the porosity of the separator layer 15 is preselected to minimize IR losses in the battery while maintaining the desired back pressure, i.e. maintaining a high "bubble pressure" for the air electrode structure. By maintaining the high bubble pressure, air is effectively precluded from percolating through the porous structure into the electrolyte, while yet being efficiently provided to the matrix active layer 11 in the operation of the battery.

Other porous materials may be utilized within the scope of the invention and, illustratively, the porous layer 15 may be formed on Quinterra asbestos paper.

Air cathodes manufactured as discussed above showed high resistance to degradation by the flowing electrolyte, while providing high electrical performance at discharge rates, such as 200 milliamperes per square centimeter.

In the illustrated embodiment, the matrix active layer had a thickness of approximately 8 to 10 mils, the collector grid had a thickness of approximately 4 to 5 mils, the polypropylene porous layer had a thickness of approximately 3 to 5 mils, and the porous polytetrafluoroethylene layer had a thickness of several mils. All of the layers where permanently bonded together by the hot pressing operation. As indicated above, the insulating porous layer 15 effectively prevents shorting of the cells during discharge, while providing improved prevention of degradation by the flowing electrolyte and maintained high bubble pressure in the operation of the battery.

The foregoing disclosure of specific embodiments is illustrative of the broad inventive concepts comprehended by the invention.

We claim:

1. A primary battery comprising an alkali metal anode and an air cathode structure spaced from said anode, said anode and cathode being adapted to contact an aqueous alkaline electrolyte during operation of said battery, said air cathode structure comprising:

a matrix active layer defining an air surface on one face thereof;

a current collector grid on said one face of the matrix active layer; and a porous, electrically nonconductive polypropylene separator on the opposite face of the matrix active layer between said matrix active layer and said anode, said collector grid and separator being permanently bonded to the matrix active layer, said separator having a preselected porosity providing low IR losses and high resistance to air flow through the matrix active layer to maintain high bubble pressure characteristics thereof.

2. The battery of claim 1 further including an outer protective layer permanently bonded on the collector grid.

3. The battery of claim 1 further including an outer protective polytetrafluoroethylene layer permanently bonded on the collector grid.

4. The battery of claim 1 wherein said anode is of a material selected from the group consisting of lithium, sodium and potassium.

5. The battery of claim 4 wherein said electrolyte is an aqueous solution of an alkali metal hydroxide.

6. The battery of claim 5 wherein said anode is of lithium, and said electrolyte is an aqueous solution of lithium hydroxide.

* * * * *